United States Patent Office 3,428,821
Patented Feb. 18, 1969

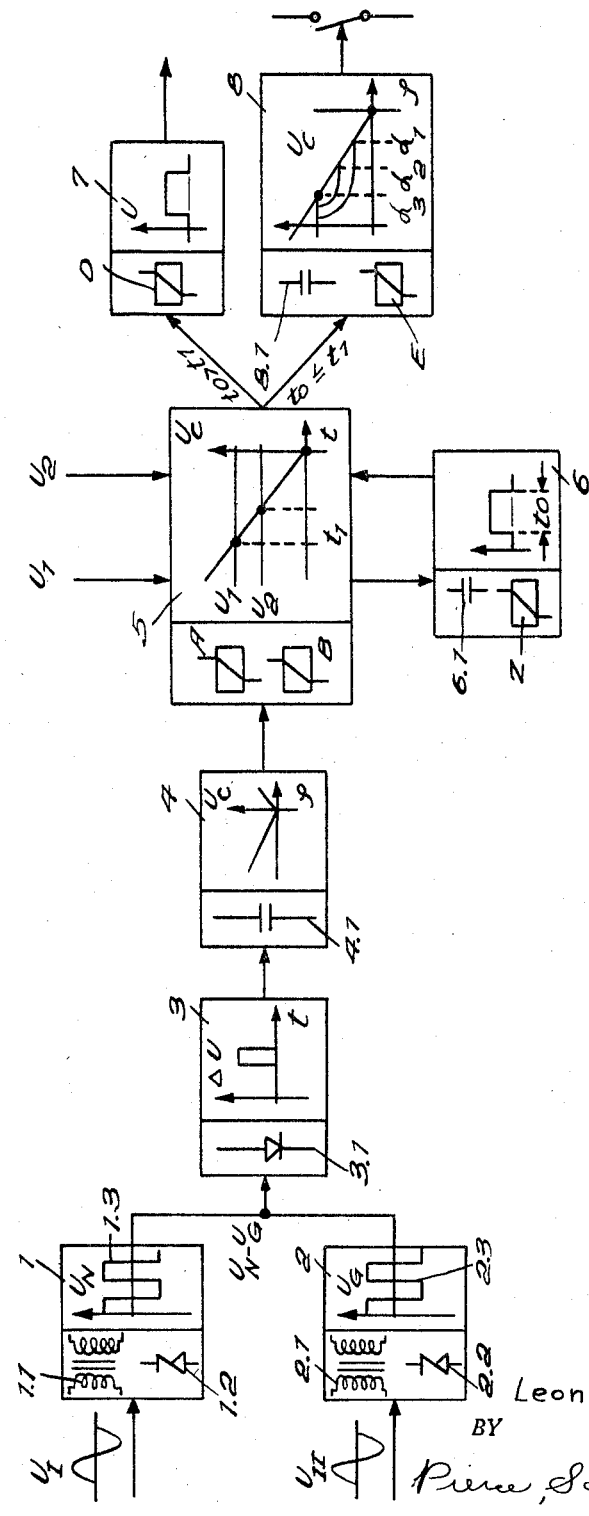

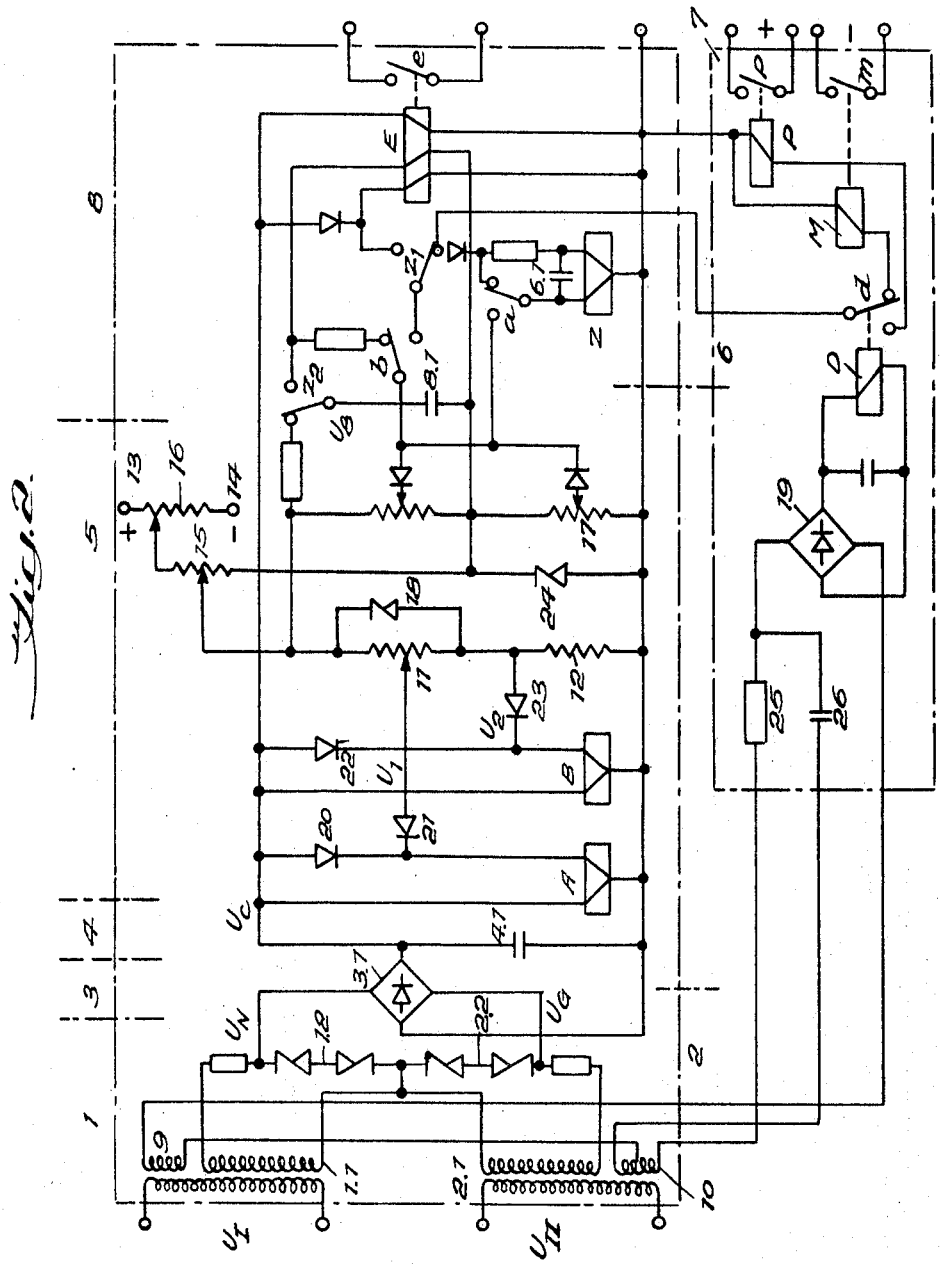

3,428,821
PARALLEL SWITCHING DEVICE
Léon Ruffieux, Wettingen, Switzerland, assignor to Aktiengesellschaft Brown, Boveri & Cie, Baden, Switzerland, a joint-stock company
Filed Oct. 17, 1966, Ser. No. 587,254
Claims priority, application Switzerland, Oct. 18, 1965,
14,328/65
U.S. Cl. 307—87      4 Claims
Int. Cl. H02j 3/08

This invention relates to a parallel switching-in device in which the frequencies and voltages of the system parts to be connected in parallel are compared and in which, depending on the magnitude of the frequency difference of the two system parts, either a frequency tuning means is provided or a switch command for parallel connection is given. The voltages are here transformed by amplitude limitation into a rectangular form and supplied to a coincidence member, which indicates the phase displacement of the two voltages.

To connect in parallel two system parts, for example, two networks, or one generator with a network, or two generators, the frequencies, phases, and voltages of both parts must, as is known, coincide well. Circuiting-in at complete coincidence, though it avoids any compensating current, requires a relatively long time until circuiting-in can be effected. It is here necessary to measure the voltages and the frequencies to complete equality.

For synchronization, however, complete equality of frequency is not necessary. One can circuit-in already when only the instantaneous position of the voltage vectors coincides. This is the case already when the beat resulting with the two frequencies shows a minimum. Also the value of the voltages need not necessarily be completely equal. While an inequality causes an inductive compensating current to flow, it cannot do any harm at small voltage differences.

Thus, to obtain a rapid synchronization it is sufficient to determine the minimum of the beat frequency. This, however, especially when one permits voltage differences, is not very exact. It actually decreases to zero only at complete equality of the voltage. Otherwise, it is a relatively wide minimum. When using static means for the determination of the minimum, that is, essentially electronic members, the voltages are rectified. But since every rectifier has a certain threshold value of the voltage, the range of the minimum or of the zero crossing becomes still wider by the rectification. To obtain a sharp peak in the beat curve also at rectification of the voltages, the voltage of the other phase, in addition to the phase voltage, may be made use of concomitantly to determine the minimum, these additional voltages just intersecting in the range of the minimum and thereby giving on the whole a sharp minimum (see German Patent 1,148,321). This arrangement, however, works only with multi-phase networks; for synchronizations of railroad networks for example, this method is not applicable. Also for three-phase networks it is desirable to connect the synchronizing equipment only in two phases, if possible, to avoid complications.

Further, it is known how to transform voltages into rectangular form so that the influence of the amplitude disappears and the overlap time can be used as a measure of the phase position. At equality of voltage a complete overlapping then occurs and at a phase displacement of 180° the overlapping disappears completely. The amount of overlap is then a measure of the phase angle between the two voltages.

In synchronizing equipments it is further necessary, as is known, to take into consideration the time between the coincidence of the two voltages and the actual circuiting-in. Each switch, in fact, has a time delay characteristic. When the circuiting-in command coincides simultaneous with coincidence of the voltages, circuiting-in by the switch is then too late because of its delay characteristic. The synchronizing equipment, therefore, must have an advance time resulting from the switch data, in order that always the correct instant can be selected.

In the known equipments, the advance time is obtained in that one utilizes, not the zero crossing of the beat curve, but a certain instantaneous value before the zero crossing as indication for the circuiting-in. The time between this instantaneous value and the zero crossing of the voltage must be approximately as long as the required advance time. Now this amplitude value depends closely on the beat frequency. At very slow beats, the time until zero crossing thus becomes longer than for faster beat frequencies. Also the amplitude of the voltage has an influence on the selected instantaneous value. This method, therefore, can be used only when the variation of the beat frequency and the amplitudes of the voltages are permitted only within narrow limits. Even if, instead of the instantaneous value itself, one uses the derivation thereof as an indication, which, of course, has equal values at different frequencies approximately at the same distance from the zero point, there still remains a voltage dependence.

From the state of the art, therefore, the problem poses itself to provide a synchronizing equipment which needs to be connected only at two phases and yet has a sharp minimum and also permits establishing as exact as possible an advance time independent of frequency and voltage.

According to the invention, this is achieved in that an integrator is provided, to which the coincidence voltage is supplied and a limiter compares this voltage with two given direct voltages of different magnitude, and that two switch members assigned to the predetermined voltages are connected with a master clock which compares a given time with the time between the response of the two switch members, either the frequency tuning device or the parallel circuiting-in device being actuated, depending on the sign of the time difference, and that the parallel circuiting-in, i.e. the connecting device has a condenser which discharges during the time between the response of the two switch members and whose residual voltage is compared with the coincidence voltage as advance voltage, so that upon coincidence of the residual voltage with the advance voltage a switch command is given and thereby the advance angle can be varied as a function of the difference frequency.

The foregoing as well as other objects and advantages inherent in the invention will become more apparent from the following detailed description of one embodiment of the invention when considered with the accompanying drawings wherein:

FIG. 1 is a presentation of the invention in a condensed i.e. block schematic form; and FIG. 2 is a more detailed exemplary circuit presentation as applied to the block schematic of FIG. 1.

With reference now to FIG. 1, the voltages $U_I$ and $U_{II}$ of the system parts to be synchronized are supplied to the blocks 1 and 2. Here $U_I$ may be a line voltage, $U_{II}$ a generator voltage. These voltages are conducted through the transformers 1.1 and 2.1 to amplitude limiters 1.2 and 2.2 consisting, for example, of Zener diodes. The sine form of the voltage present at the input is thereby transformed into a rectangular form ($U_N$ and $U_G$), whose magnitude remains unchanged from a certain value on. The amplitudes of the voltage curve $U_I$ and $U_{II}$ then no longer have any effect on the magnitude of the rectangular voltages $U_N$ and $U_G$. Therefore the voltage differences are left out of consideration.

From the two voltages $U_N$ and $U_G$ the difference $U_N-U_G$ is formed. The latter now depends on the phase angle, and hence also on the frequency, of the two voltages $U_N$ and $U_G$. If the phase is practically the same, the difference is zero; the two voltages then overlap completely. But if there are phase differences, they do not overlap completely, and the remainder appears as difference voltage, which is the greater as the phase difference is greater.

In block 3, this difference voltage is rectified by the rectifier arrangement 3.1. The resulting voltage $\Delta U$ then is a pulse of different width dependent on the phase angle of the original voltages. The pulses thus produced now charge in block 4 the condenser 4.1 acting as integrator. At the output of this condenser a voltage $U_C$ then forms, which increases the faster as the pulses are wider, that is, as the phase displacement of the voltages is greater. At phase equality this results in a sharp minimum, as the diagram for the voltage $U_C$ entered in block 4 shows.

The voltage $U_C$ is now supplied to block 5 containing the switch members A and B. These are illustrated as differential relays, which are actuated by the differences of the supplied voltage $U_C$ and a predetermined voltage $U_1$ and $U_2$. While the voltage $U_C$ decreases, first relay A and then, after a time determined by the pulse width, relay B is actuated. The distance of the two voltages $U_1$ and $U_2$ can be set. The time $t_1$ which passes between the response of relays A and B is then the measure of the frequency difference of the supplied voltage. If the time lasts long, synchronization is possible. But if it is short, the frequency difference is too great and the frequency must be tuned. Time $t_1$ must now be compared with a time $t_0$ predetermined by a master clock 6 in an additional relay circuit with relay Z. The difference $t_1-t_0$ then is a measure of whether or not it is permissible to circuit-in. If $t_0 \leq t_1$ circuiting-in is possible. If $t_0 > t_1$ the speed of rotation must be changed. Depending on the magnitude of the time difference, therefore, block 7 or block 8 is actuated. In block 7 a pulse for speed adjustment is given. Block 8 gives the switch command with consideration of the advance time. The latter is determined as follows: During the time $t_1-t_0$, condenser 8.1 is discharged. The point of response of relay E is attained when the voltage $U_C$ and the residual voltage $U_8$ of condenser 8.1 are equal. For a long discharge time, the frequency difference is small. The point of response is then reached already at an angle $\alpha_1$ for example. If the discharge time is shorter, the frequency difference is greater; then switching occurs at a greater angle, for example $\alpha_2$. The maximum permissible angle is $\alpha_3$. It determines the maximum permissible frequency difference. In this case $t_1-t_0=0$. The switching occurs through relay E, which is designed as rapid-switching vacuum relay, so that this does not cause any additional delay. The angles $\alpha$ are here the advance angles for the circuit. They correspond to a contant advance time. By variation of the advance angle $\alpha$ as a function of the frequency differences, therefore, the same advance time is obtained.

In block 7 a reversing relay D is provided as a frequency dividing filter. It is thereby established whether the frequency must be increased or reduced.

With this arrangement one obtains a rapid synchronization which up to a predetermined frequency difference functions always with the same advance time, it being possible to determine the point of frequency equality sharply. Also the possibility is utilized of synchronizing at relatively great frequency differences.

The circuit of the individual blocks is shown more precisely in FIG. 2. There the boundaries between the blocks shown in FIG. 1 are indicated once more by dash-dot lines. Specifically the constructions according to FIG. 1 are supplemented by the following constructions: The transformers 1.1 and 2.1 each have a secondary winding 9 and 10, which feed the frequency tuning arrangement 7. To the latter the difference between the two voltages is supplied. The amplitude limitation occurs by the Zener diodes 1.2 and 2.2, which respond upon exceeding the instantaneous values of both half-waves and thereby conduct limited values to the rectifier. The voltage $U_C$ forms at the condenser 4.1 and is supplied to the relays A and B. These relays receive, moreover, constant voltages $U_1$ and $U_2$. These voltages are derived from a potentiometer arrangement which is seen to comprise a potentiometer 16 energized from D.C. supply terminals 13 and 14. The adjustable tap on potentiometer 16 feeds a second potentionmeter 15 and the adjustable tap on potentiometer 15 is connected to a further potentiometer 11 and a resistance 12 connected in series. The voltage $U_1$ is supplied from the tap on potentiometer 11 and voltage $U_2$ is supplied by the voltage drop across resistance 12. The potentiometers 11, 15 and 16 permit adjusting the voltage, the potentiometers 11 and 15 determining the maximum permissible frequency difference, the potentiometer 16, the time adjustment for the advance. Potentiometer 11 has connected in parallel with it a Zener diode 18, and a potentiometer 17 has a parallel connected Zener diode 24. These act as non-linear resistances and make the voltage adjustment of potentiometer 11 approximately independent of the remaining potentiometers. Therefore, two voltages are supplied to the relays A and B; they are connected as differential relays, so that they trip upon zero crossing of the difference. Relay A compares the voltages $U_1$ and $U_C$ by means of rectifiers 20 and 21, that is, it responds when $U_C$ is smaller than or equal to $U_1$ and thereby 20 blocks. Relay B compares the voltages $U_2$ and $U_C$ by means of the rectifiers 22 and 23 and responds when $U_C$ becomes smaller than $U_2$. It is seen that voltage $U_2$ is smaller than $U_1$, so that during the discharge of condenser 4.1 relay A must respond earlier than relay B. Relay A throws the contact $a$ over, whereby the voltage of potentiometer 17 is applied to relay Z. Thereby both windings of relay Z receive voltage. In this position, however, the contacts $z_1$ and $z_2$ are not yet thrown over, as the left winding of the relay receives more current than the right. This is caused, for one thing, by the position of the contacts $a$, which connect the voltage at potentiometer 17 directly to the left winding of relay Z, and for another, by the fact that the condenser 6.1 delays the dropping of the current in the right winding. If now relay B responds before relay Z has responded, contact $b$ is closed and relay Z is maintained in its neutral position through the opening contact $z_1$. Thereby voltage is applied to the frequency tuning relays M or P. But if relay Z responds earlier than relay B, contact $z_1$ is thrown over and through contact $b$ relay E is prepared for the release command. Let the time between the response of relays A and B be $t_1$. Let the response time of relay Z be $t_0$. Therefore, if $t_0 \leq t_1$, the contacts $z_1$ and $z_2$ are thrown over. Thereby condenser 8.1 is discharged through relay E and prepares the release command. If then the discharge voltage of 8.1 reaches the same value of the voltage $U_C$, which is applied to the other winding of relay E, the release command is given. By adjustment of potentiometer 17, the response value of relay E can be set.

However, if $t_0 > t_1$, voltage is applied to the frequency tuning device 7. Device 7 is fed by the difference voltage of the two voltages to be synchronized from the windings 9 and 10 through rectifier 19. Depending on the direction of this difference voltage, relay D responds in one or the other sense. It switches on either relay M or relay P. Relay M decreases the speed and hence the frequency, relay P increases them. Now the direction of the difference voltage is ascertained as follows: The voltage at winding 9 is conducted directly to rectifier 19, the voltage at winding 10 through a phase rotation member 25, 26. Relay D is a very rapidly switching relay, for example, a vacuum relay and, like all relays, has a holding ratio, that is, it responds at a somewhat higher value than the value at which it releases (drops). Now this property can be utilized in connection with the phase displacement and the pulse transmission by the synchronizing device, voltage at the pivot of contact $d$. Behind the rectifier 19 there results a rectified voltage with the beat frequency between the frequencies of the voltages to be compared. If, for example, $U_{II}$ has a higher frequency than $U_I$, relay M must be actuated; this takes place when the control pulse arrives precisely at the time when the relay D has released. If, conversely, the frequency of voltage $U_{II}$ is lower than voltage $U_I$, the pulse arrives when relay D is attracted. Thereby relay P is then actuated and increases the speed of rotation and hence also the frequency. Relay D now operates in the rhythm of the beat; it attracts when a certain voltage level has been reached. At too low a frequency of $U_2$, the voltage decreases precisely when the control command occurs in the synchronizing device. Due to the fact that the relay releases at a lower value than it responds, enough time is available to control the frequency upward. At too high a frequency, the voltage increases precisely when the control command occurs in the synchronizing device. But then the relay responds only at a higher value, so that the relay is maintained in the neutral position longer and the frequency can be controlled upward. After the frequency has been tuned, the device operates once more. If then $t_0 > t_1$, circuiting-in can be done. The other, non-designated elements, resistors, rectifiers serve for limitation and for the prevention of return currents.

The advantage of the arrangement according to the invention is that even at voltage differences and attainment of the permissible limits of frequency differences, circuiting-in can be effected. The permissible limit can be set by the potentiometer 15. The advance time functions correctly in any case and is adjustable in wide limits. It has been achieved that thereby a simple arrangement is provided which operates faster than previously known equipments. It is independent of the magnitude of the voltages to be compared and can be used for different operating frequencies.

I claim:

1. Apparatus for connecting two alternating voltages in parallel comprising means for converting each of said voltages into substantially rectangular pulse form, means comparing said voltages in pulse form to obtain the difference voltage pulse, means rectifying said difference voltage pulse to obtain a direct control voltage pulse the width of which constitutes a measure of the displacement in phase between said alternating voltages, means integrating said control pulse to obtain a control voltage, first and second differential relays, one winding of each said differential relay being connected to said control voltage and the other winding of each said differential relay being connected respectively to reference voltages of different magnitude thereby to effect a sequential actuation of said relays, means producing a master time reference interval, means comparing the actual time interval between successive actuation of said relays with said master time interval reference to produce a difference time interval, relay means for switching said alternating voltages in parallel, relay means for effecting a change in frequency of one of said alternating voltages, and means for actuating said parallel switching-in means or said frequency changing means dependent upon the sense of said difference time interval.

2. Apparatus as defined in claim 1 wherein said relay means for switching-in said alternating voltages in parallel includes a condenser which discharges in the time interval occurring between said successive actuation of said differential relays and means comparing the residual voltage on said condenser with said direct control voltage pulse which serves as an advance voltage such that at coincidence therebetween, a parallel switching in command is given and thereby the advance angle can be varied as a function of the difference in frequency between said alternating voltages.

3. Apparatus as defined in claim 2 and which includes means for adjusting the advance voltage for operation of the parallel switching-in of the two alternating voltages.

4. Apparatus as defined in claim 1 wherein said relay means for effecting a change in the frequency of one of said alternating voltages is associated with a phase rotating arrangement for one of said alternating voltages and there is included a rectifier arrangement which rectifies difference between the two voltages, and also a relay actuated by said difference voltage, said relay being so constructed that at increasing voltage it attracts its contacts at a higher voltage value and that at decreasing voltage it releases its contacts at a lower value.

References Cited

UNITED STATES PATENTS

| 2,442,123 | 5/1948 | Espley et al. | 307—87 |
| 2,712,065 | 6/1955 | Elbourn et al. | 307—87 |
| 3,210,556 | 10/1965 | Billings | 307—87 |

ROBERT K. SCHAEFER, *Primary Examiner.*

H. J. HOHAUSER, *Assistant Examiner.*